(12) United States Patent
Chien et al.

(10) Patent No.: US 9,633,542 B2
(45) Date of Patent: Apr. 25, 2017

(54) ELECTRONIC DEVICE AND COMPUTER-BASED METHOD FOR REMINDING USING THE ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Cheng-Ching Chien, New Taipei (TW); Guo-Tao Feng, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 56 days.

(21) Appl. No.: 14/660,164

(22) Filed: Mar. 17, 2015

(65) Prior Publication Data

US 2016/0163180 A1 Jun. 9, 2016

(30) Foreign Application Priority Data

Dec. 9, 2014 (CN) .......................... 2014 1 0744466

(51) Int. Cl.
*G08B 21/24* (2006.01)
*G06K 9/00* (2006.01)
*B26B 19/38* (2006.01)
*B26B 19/48* (2006.01)

(52) U.S. Cl.
CPC ............ *G08B 21/24* (2013.01); *B26B 19/388* (2013.01); *B26B 19/48* (2013.01); *G06K 9/00268* (2013.01)

(58) Field of Classification Search
CPC ....... G08B 21/24; B26B 19/388; B26B 19/48; G06K 9/00268
USPC .................................................. 348/373–376
See application file for complete search history.

(56) References Cited

U.S. PATENT DOCUMENTS

| 7,738,032 | B2 * | 6/2010 | Kollias | G03B 29/00 348/333.11 |
| 2010/0097485 | A1 * | 4/2010 | Lee | G06T 7/0012 348/222.1 |
| 2012/0044335 | A1 * | 2/2012 | Goto | A45D 44/005 348/77 |
| 2012/0320180 | A1 * | 12/2012 | Binder | A45D 26/00 348/77 |
| 2013/0129210 | A1 * | 5/2013 | Na | G06K 9/00268 382/165 |

* cited by examiner

*Primary Examiner* — Nhan T Tran
*Assistant Examiner* — Chan Nguyen
(74) *Attorney, Agent, or Firm* — Steven Reiss

(57) ABSTRACT

In a method for reminding using an electronic device, the method includes controlling a front camera of the electronic device to capture a facial image, determining whether a user needs to shave according to the characteristic information of a beard region of the facial image, and controlling a reminding device to remind the user to shave.

12 Claims, 5 Drawing Sheets

ELECTRONIC DEVICE AND COMPUTER-BASED METHOD FOR REMINDING USING THE ELECTRONIC DEVICE

CROSS-REFERENCE TO RELATED APPLICATIONS

This application claims priority to Chinese Patent Application No. 201410744466.2 filed on Dec. 9, 2014, the contents of which are incorporated by reference herein.

FIELD

The subject matter herein generally relates to smart electronic devices, and particularly to an electronic device and a method for reminding a user to shave.

BACKGROUND

People can use smart electronic devices, such as smart phone or tablet computer, to do a lot of things, such as reminder to do something.

BRIEF DESCRIPTION OF THE DRAWINGS

Implementations of the present disclosure will now be described, by way of example only, with reference to the attached figures.

DETAILED DESCRIPTION

Figure 1:
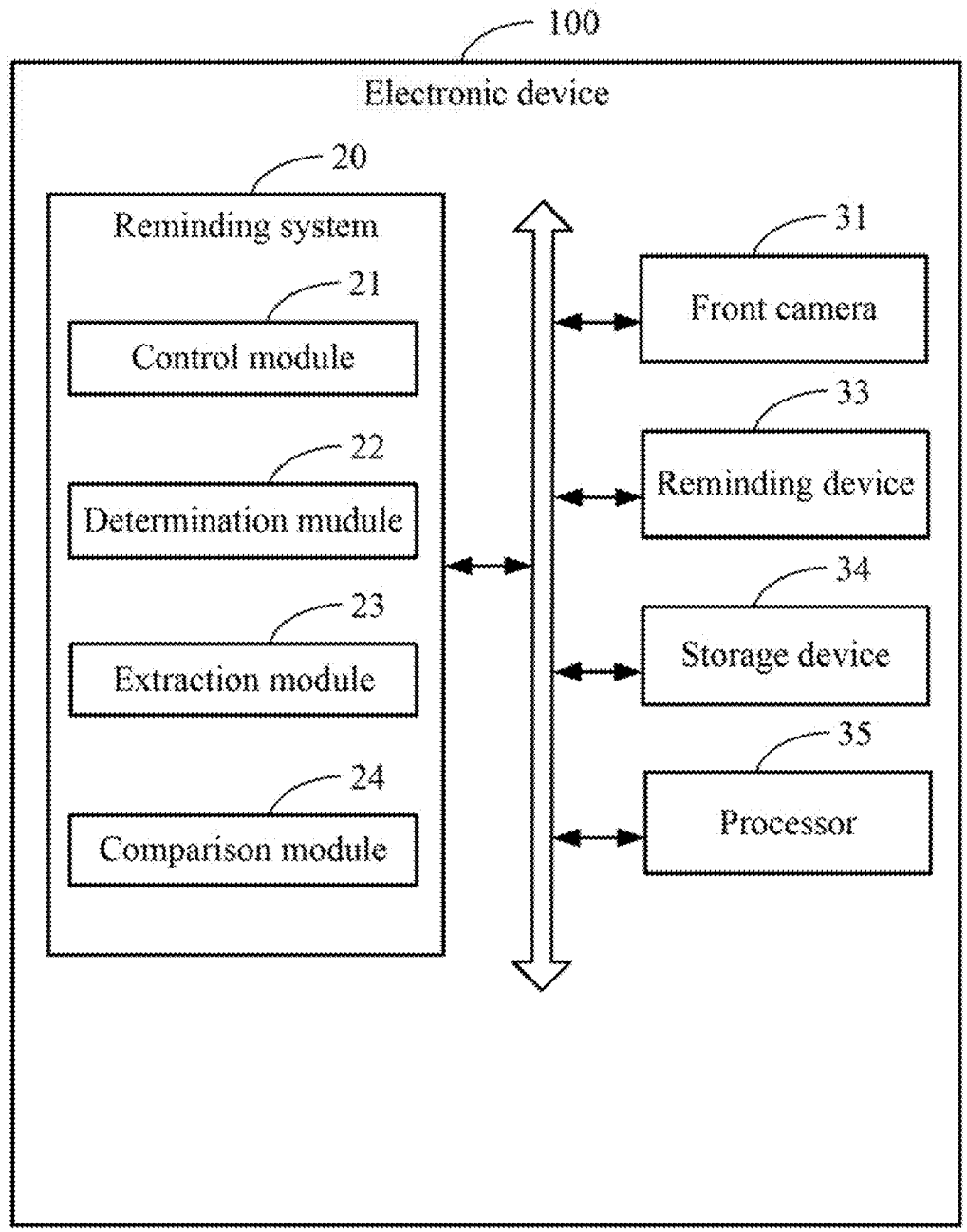
FIG. 1 is a block diagram of an example embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features of the present disclosure.

Several definitions that apply throughout this disclosure will now be presented.

The term "comprising" means "including, but not necessarily limited to"; it specifically indicates open-ended inclusion or membership in a so-described combination, group, series and the like. The term "module" refers to logic embodied in hardware or firmware, or to a collection of software instructions, written in a programming language, such as, Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of an example embodiment of an electronic device 100. In at least one embodiment, the electronic device 100 includes, but is not limited to, a reminding system 20, a front camera 31, a reminding device 33, a storage device 34, and at least one processor 35. FIG. 1 illustrates only one example of the electronic device 100, and other examples can comprise more or fewer components then shown in the embodiment, or have a different configuration of the various components.

In one embodiment, the reminding system 20 is configured to control the front camera 31 to capture a facial image, and determine whether a user needs to shave according to the characteristic information of a beard region of the facial image, and control the reminding device 33 to remind the user to shave.

In one embodiment, the electronic device 100 can be mobile phones, personal digital assistants (PDAs), or any other suitable electronic devices. When the user wakes up or powers on the electronic device 100, the reminding system 20 automatically starts to work. In other embodiments, the electronic device 100 can be a suitable electronic device usually placed in some particular place, such as a washroom, which includes detection device and camera. Once the detection device detects that someone approaches the electronic device 100, the reminding system 20 automatically starts to work.

The storage device 34 can be an internal storage device, such as a flash memory, a random access memory (RAM) for temporary storage of information, and/or a read-only memory (ROM) for permanent storage of information. The storage device 34 can also be an external storage device, such as an external hard disk, a storage card, or a data storage medium. The at least one processor 35 can be a central processing unit (CPU), a microprocessor, or other data processor chip that performs functions of the electronic device 100.

In one embodiment, the reminding system 20 includes a control module 21, a determination module 22, an extraction module 23, and a comparison module 24. Modules 21-24 can comprise computerized instructions in the form of one or more computer-readable programs that can be stored in a non-transitory computer-readable medium, for example in the storage device 34, and are executed by the at least one processor 35 of the electronic device 100 to provide functions of the present disclosure. A detailed description of the functions of the modules 21-24 is given below in reference to FIG. 1.

In one embodiment, the control module 21 can control the front camera 31 to capture a facial image. The determination module 22 can determine a cheek region and a beard region from the facial image.

Figures 2A, 2B, 2C:
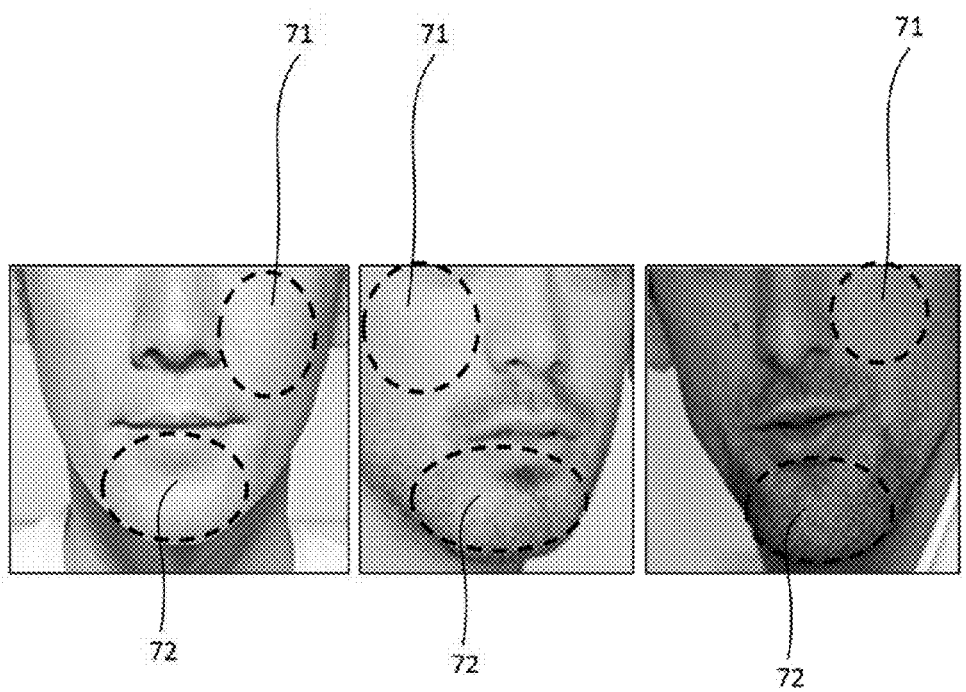
FIG. 2A shows a diagrammatic view of an example of a first facial image.
FIG. 2B shows a diagrammatic view of an example of a second facial image.
FIG. 2C shows a diagrammatic view of an example of a third facial image.

In the embodiment, as shown in FIGS. 2A-2C, the determination module 22 can determine positions of ears, eyes, nose, mouth, or chin from the facial image based on existing face recognition technology, and determine a region 71 surrounded by ears, eyes, and nose to be the cheek region, and determine a region 72 between mouth and nose, and a region 72 between mouth and chin to be the beard region.

The extraction module 23 can extract characteristic information of the cheek region and the beard region from the facial image. In the embodiment, the characteristic information can be color.

The comparison module 24 can compare the characteristic information of the cheek region and the beard region, and determine a difference value between the two regions. In the embodiment, the control module 21 can determine beard growth according to the difference value, and upon determining that the difference value exceeds a predetermined threshold, the control module 21 can control the reminding device 33 to emit and alert to remind the user to shave.

In the embodiment, the predetermined threshold includes multiple thresholds, for example, a first threshold which corresponds to a collection of relatively small differences as shown in FIG. 2A, a second threshold which corresponds to a collection of relatively big differences as shown in FIG. 2B, and a third threshold which corresponds to a collection of relatively significant differences as shown in FIG. 2C.

In the embodiment, the storage device 34 can further store a relation list which defines a relationship between multiple thresholds and multiple reminders. For example, the reminder corresponding to the difference value which exceeds the first threshold can be no action. The reminder corresponding to the difference value which exceeds the second threshold can be a first predetermined message, such as "please shave within 24 hours" displayed on the display screen, vibrating the electronic device 100 in a first predetermined frequency, a first predetermined voice message read by a loudspeaker, or any other suitable reminder or any combination thereof. The reminder corresponding to the difference value which exceeds the third threshold can be a second predetermined message, such as "please shave immediately" displayed on the display screen, vibrating the electronic device 100 in a second predetermined frequency, reading a second predetermined voice message read by a loudspeaker, or any other suitable reminder or any combination thereof.

In the embodiment, the reminding device 33 is selected from a group consisting of a display screen, a vibrator, a loud speaker, any other suitable reminding device, and any combination thereof. The display screen can display a predetermined message, the vibrator can vibrate the electronic device 100, and the loudspeaker can read a predetermined voice message.

The control module 21 can further acquire from the relation list a reminder corresponding to a relationship between the determined difference value and the multiple thresholds, and control the reminding device 33 to remind the user to shave using the acquired reminder.

Figure 3:
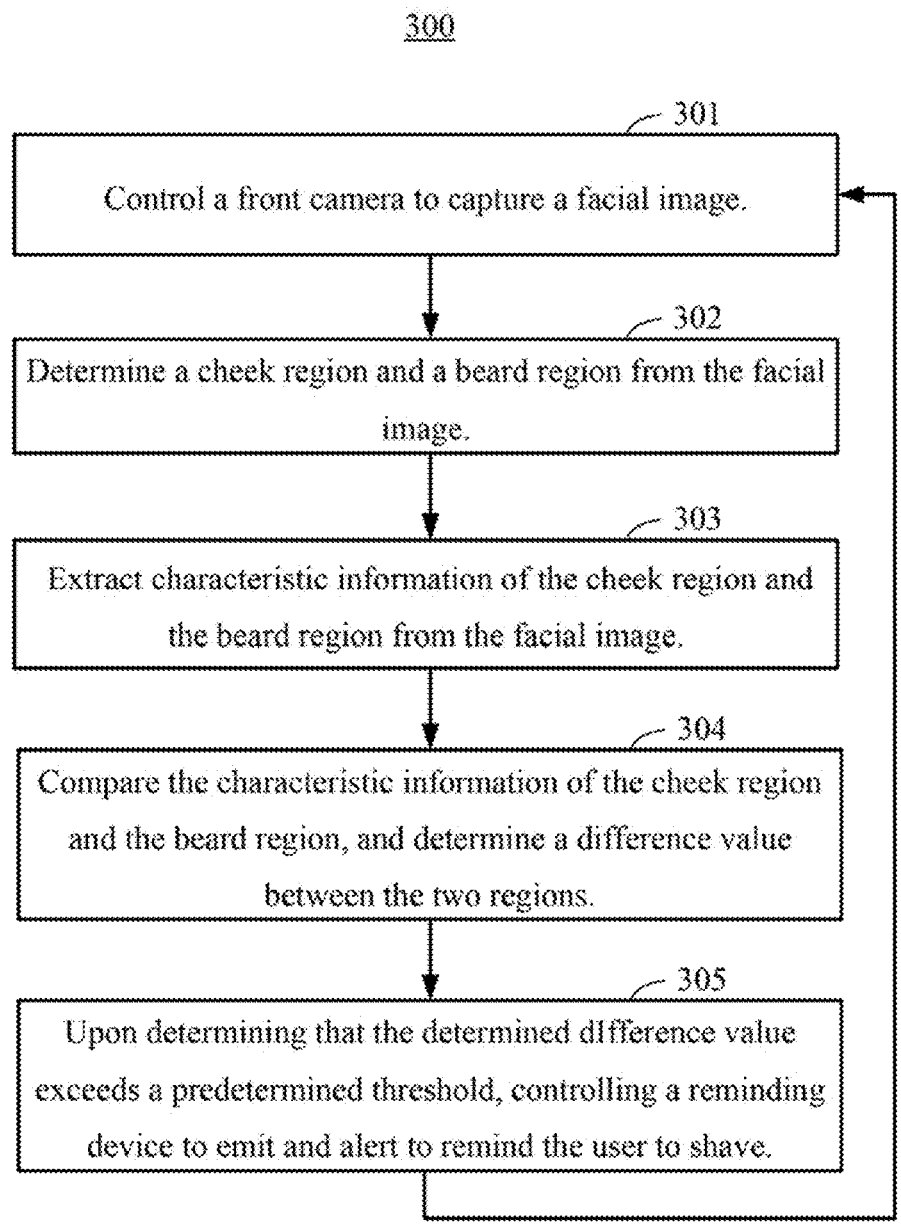
FIG. 3 is a flowchart of an example embodiment of a method for reminding.

FIG. 3 illustrates a flowchart of an example embodiment of a method to remind a user to shave using an electronic device. In an example embodiment, the method 300 is performed by execution of computer-readable software program codes or instructions by at least one processor 35 of the electronic device 100.

Referring to FIG. 3, a flowchart is presented in accordance with an example embodiment which is being thus illustrated. The example method 300 is provided by way of example, as there are a variety of ways to carry out the method. The method 300 described below can be carried out using the configurations illustrated in FIG. 1, for example, and various elements of these figures are referenced in explaining method 300. Each block shown in FIG. 3 represents one or more processes, methods, or subroutines, carried out in the exemplary method 300. Furthermore, the illustrated order of blocks is by example only and the order of the blocks can change according to the present disclosure. Additional blocks can be added or fewer blocks can be utilized, without departing from this disclosure. The example method 300 can begin at block 301.

At block 301, a control module controls a front camera of the electronic device to capture a facial image.

At block 302, a determination module determines a cheek region and a beard region from the facial image.

At block 303, an extraction module extracts characteristic information of the cheek region and the beard region from the facial image.

At block 304, a comparison module compares the characteristic information of the cheek region and the beard region, and determines a difference value between the two regions. Upon determining that the determined difference value exceeds a predetermined threshold, such as the first threshold, the second threshold, or the third threshold, the block 305 is implemented.

At block 305, the control module controls the reminding device to emit and alert to remind the user to shave.

Figure 4:
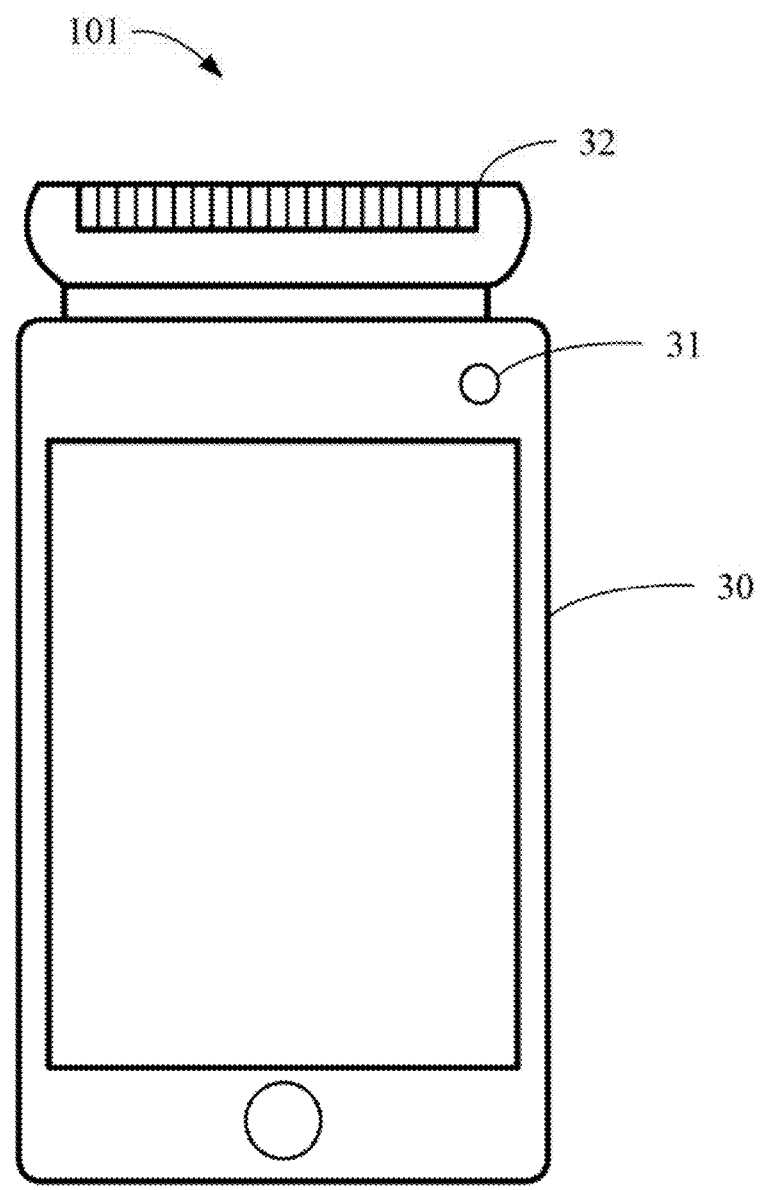
FIG. 4 is a diagrammatic view of an example embodiment of an electronic device.
Figure 5:
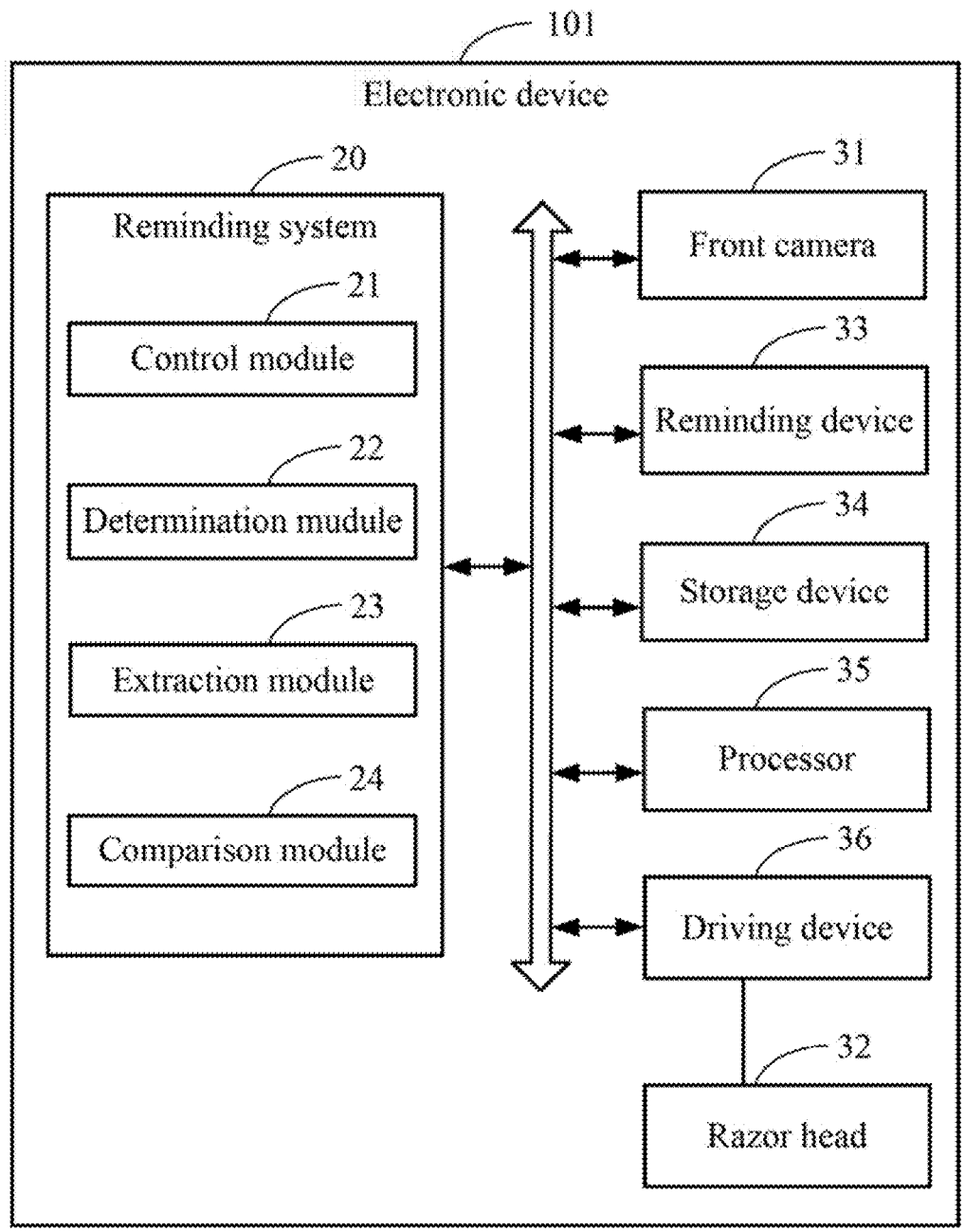
FIG. 5 is a block diagram of another example embodiment of the electronic device of FIG. 4.

FIGS. 4 and 5 show in other examples that the electronic device 101 further includes a housing 30, a razor head 32 and a driving device 36. The front camera 31 and the razor head 32 are mounted on the housing 30. The driving device 36 is positioned in the housing 30. The driving device 36 is configured to drive the razor head 32 for shaving.

In one embodiment, the control module 21 can control the driving device 36 to work, in order to drive the razor head 32 for shaving. In other embodiments, the electronic device 101 further includes a switch (not shown) mounted on the housing 30. The switch is configured to control the driving device 36 to work, in response to an operation, in order to drive the razor head 32 for shaving.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. An electronic device comprising:
a front camera and a reminding device;
at least one processor; and
a storage device storing one or more programs, which when executed by the at least one processor, cause the at least one processor to:
control the front camera to capture a facial image;
determine a cheek region and a beard region from the facial image;
extract characteristic information of the cheek region and the beard region from the facial image;
compare the characteristic information of the cheek region and the beard region, and determine a difference value between the two regions; and
upon determining that the difference value exceeds a predetermined threshold, control the reminding device to emit and alert to remind the user to shave, wherein the predetermined threshold comprises a first threshold which corresponds to a collection of relatively small differences, a second threshold which corresponds to a collection of relatively big differences, and a third threshold which corresponds to a collection of relatively significant differences.

2. The electronic device as described in claim 1, wherein the storage device further stores a relation list which defines multiple reminders corresponding to different difference values; wherein the at least one processor further acquires from the relation list a reminder corresponding to a relationship between the determined difference value and the multiple thresholds, and controls the reminding device to remind the user to shave using the acquired reminder.

3. The electronic device as described in claim 2, wherein the reminder corresponding to the difference value which exceeds the first threshold is no action; the reminder corresponding to the difference value which exceeds the second threshold is selected from a group consisting of a first predetermined message displayed on a display screen, vibrating the electronic device in a first predetermined frequency, a first predetermined voice message read by a loudspeaker, and any combination thereof and the reminder corresponding to the difference value which exceeds the third threshold is selected from a group consisting of a second predetermined message displayed on a display screen, vibrating the electronic device in a second predetermined frequency, a second predetermined voice message read by a loudspeaker, and any combination thereof.

4. The electronic device as described in claim 2, wherein the reminding device is selected from a group consisting of a display screen, a vibrator, a loud speaker, and any combination thereof, wherein the display screen is configured to display a predetermined message, the vibrator is configured to vibrate the electronic device, and the loudspeaker is configured to read a predetermined voice message.

5. The electronic device as described in claim 1, further comprising:
a housing;
a razor head mounted on the housing; and
a driving device positioned in the housing, the driving device configured to drive the razor head for shaving.

6. The electronic device as described in claim 5, wherein the at least one processor further controls the driving device to work, in order to drive the razor head for shaving.

7. The electronic device as described in claim 5, further comprising a switch mounted on the housing, the switch configured to control the driving device to work in response to user's operation, in order to drive the razor head for shaving.

8. A computer-based method for reminding using an electronic device, the method comprising:
controlling a front camera of the electronic device to capture a facial image;
determining a cheek region and a beard region from the facial image;
extracting characteristic information of the cheek region and the beard region from the facial image;
comparing the characteristic information of the cheek region and the beard region, and determine a difference value between the two regions; and
upon determining that the determined difference value exceeds a predetermined threshold, controlling a reminding device to emit and alert to remind the user to shave, wherein the predetermined threshold comprises a first threshold which corresponds to a collection of relatively small differences, a second threshold which corresponds to a collection of relatively big differences, and a third threshold which corresponds to a collection of relatively significant differences.

9. The method as described in claim 8, further comprising:
acquiring from a relation list a reminder corresponding to a relationship between the determined difference value and the multiple thresholds, wherein the relation list is stored in the electronic device and defines multiple reminders corresponding to different difference values; and
controlling the reminding device to remind the user to shave using the acquired reminder.

10. The method as described in claim 9, wherein the reminder corresponding to the difference value which exceeds the first threshold is no action; the reminder corresponding to the difference value which exceeds the second threshold is selected from a group consisting of a first predetermined message displayed on a display screen, vibrating the electronic device in a first predetermined frequency, a first predetermined voice message read by a loudspeaker, and any combination thereof; and the reminder corresponding to the difference value which exceeds the third threshold is selected from a group consisting of a second predetermined message displayed on a display screen, vibrating the electronic device in a second predetermined frequency, a second predetermined voice message read by a loudspeaker, and any combination thereof.

11. A non-transitory computer-readable medium having stored thereon instructions that, when executed by at least one processor of an electronic device, causing the electronic device to perform a method for reminding, the method comprising:
controlling a front camera of the electronic device to capture a facial image;
determining a cheek region and a beard region from the facial image;
extracting characteristic information of the cheek region and the beard region from the facial image;
comparing the characteristic information of the cheek region and the beard region, and determine a difference value between the two regions; and
upon determining that the determined difference value exceeds a predetermined threshold, controlling a reminding device to emit and alert to remind the user to shave, wherein the predetermined threshold comprises a first threshold having small difference, a second threshold having big difference, and a third threshold having significant difference.

12. The non-transitory computer-readable medium as described in claim 11, further comprising:
acquiring from a relation list a reminder corresponding to a relationship between the determined difference value and the multiple thresholds, wherein the relation list is stored in the electronic device and defines multiple reminders corresponding to different difference values; and
controlling the reminding device to remind the user to shave using the acquired reminder.

\* \* \* \* \*